(12) United States Patent
Shimayabu

(10) Patent No.: US 10,308,238 B2
(45) Date of Patent: Jun. 4, 2019

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventor: Kohei Shimayabu, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 6 days.

(21) Appl. No.: 15/872,092

(22) Filed: Jan. 16, 2018

(65) Prior Publication Data

US 2018/0201252 A1 Jul. 19, 2018

(30) Foreign Application Priority Data

Jan. 19, 2017 (JP) .................................. 2017-007656

(51) Int. Cl.
*B60K 6/365* (2007.10)
*B60K 6/383* (2007.10)
(Continued)

(52) U.S. Cl.
CPC ............. *B60W 20/20* (2013.01); *B60K 6/365* (2013.01); *B60K 6/383* (2013.01); *B60K 6/442* (2013.01);
(Continued)

(58) Field of Classification Search
CPC ...... B60W 20/20; B60W 20/15; B60W 10/06; B60W 40/09; B60W 10/08; B60W 30/1843; B60W 2510/107; B60W 2540/30; B60W 2710/086; B60W 2710/08; B60K 6/383; B60K 6/445; B60K 6/365; B60K 6/442; F16H 37/065; Y02T 10/7077; Y02T 10/6239; Y02T 10/6234; B60Y 2300/62;
(Continued)

(56) References Cited

U.S. PATENT DOCUMENTS

2015/0367832 A1* 12/2015 Oshiumi ............... B60K 6/445
701/22
2016/0101771 A1 4/2016 Hata et al.
(Continued)

FOREIGN PATENT DOCUMENTS

JP 2016-078551 A 5/2016
JP 2016-078552 A 5/2016
(Continued)

*Primary Examiner* — Russell Frejd
(74) *Attorney, Agent, or Firm* — Oliff PLC

(57) ABSTRACT

An electronic control unit of a control device for a hybrid vehicle sets any of a hybrid traveling mode, a single motor drive electric traveling mode, and a dual motor drive electric traveling mode. The electronic control unit prohibits setting of the dual motor drive electric traveling mode when a pinion temperature is higher than an upper limit temperature, and sets the hybrid traveling mode. The electronic control unit releases the prohibition of the dual motor drive electric traveling mode when the pinion temperature is decreased to or below a release temperature lower than the upper limit temperature in a state where setting of the dual motor drive electric traveling mode is prohibited. The electronic control unit restricts output of the first motor in the dual motor drive electric traveling mode when the pinion temperature is higher than the upper limit temperature.

3 Claims, 13 Drawing Sheets

(51) Int. Cl.
*B60K 6/442* (2007.10)
*B60K 6/445* (2007.10)
*B60W 10/06* (2006.01)
*B60W 10/08* (2006.01)
*B60W 20/15* (2016.01)
*B60W 20/20* (2016.01)
*B60W 40/09* (2012.01)
*F16H 37/06* (2006.01)
*B60W 30/184* (2012.01)

(52) U.S. Cl.
CPC .............. *B60K 6/445* (2013.01); *B60W 10/06* (2013.01); *B60W 10/08* (2013.01); *B60W 20/15* (2016.01); *B60W 30/1843* (2013.01); *B60W 40/09* (2013.01); *F16H 37/065* (2013.01); *B60W 2510/107* (2013.01); *B60W 2540/30* (2013.01); *B60W 2710/08* (2013.01); *B60W 2710/086* (2013.01); *B60Y 2200/92* (2013.01); *B60Y 2300/62* (2013.01); *B60Y 2400/73* (2013.01); *Y02T 10/6234* (2013.01); *Y02T 10/6239* (2013.01); *Y02T 10/7077* (2013.01); *Y10S 903/906* (2013.01); *Y10S 903/91* (2013.01)

(58) Field of Classification Search
CPC ............. B60Y 2200/92; B60Y 2400/73; Y10S 903/91; Y10S 903/906
See application file for complete search history.

(56) References Cited

U.S. PATENT DOCUMENTS

| | | |
|---|---|---|
| 2016/0101773 A1 | 4/2016 | Hata et al. |
| 2016/0101776 A1 | 4/2016 | Hata et al. |
| 2016/0137050 A1* | 5/2016 | Nishimine ............. B60K 6/445 475/2 |
| 2016/0176392 A1* | 6/2016 | Murata ................. B60K 6/445 701/22 |
| 2016/0207519 A1* | 7/2016 | Hata .................... B60W 20/10 |
| 2016/0297444 A1* | 10/2016 | Endo ................. B60W 30/1843 |

FOREIGN PATENT DOCUMENTS

| | | |
|---|---|---|
| JP | 2016-078553 A | 5/2016 |
| JP | 2016-107709 A | 6/2016 |

* cited by examiner

FIG. 5

Mup    a: TEMPERATURE RISE GRADIENT

| | MG1 ROTATIONAL SPEED | |
|---|---|---|
| | SMALL | LARGE |
| MG1 TORQUE   SMALL | $a_{11}$    $a_{21}$ -------- $a_{i1}$ $a_{12}$ | |
| LARGE | $a_{1j}$ -------------------- $a_{ij}$ | |

→ LARGE
↓ LARGE
→ LARGE

FIG. 6

Mdw1    −b: TEMPERATURE FALL GRADIENT

| | OIL TEMPERATURE | |
|---|---|---|
| | SMALL | LARGE |
| ENGINE ROTATIONAL SPEED   SMALL | $-b_{11}$    $-b_{21}$ -------- $-b_{i1}$ $-b_{12}$ | |
| LARGE | $-b_{1j}$ -------------------- $-b_{ij}$ | |

→ LARGE
↓ LARGE
→ LARGE

FIG. 7

Mdw2    −c: TEMPERATURE FALL GRADIENT

| | OIL TEMPERATURE | |
|---|---|---|
| | SMALL | LARGE |
| EOP ROTATIONAL SPEED  SMALL — LARGE | $-c_{11}$   $-c_{21}$ ---------- $-c_{i1}$ <br> $-c_{12}$ <br> ↘ LARGE  ↓ <br>       LARGE <br> → LARGE <br> $-c_{1j}$ ------------------ $-c_{ij}$ | | ns
CONTROL DEVICE FOR HYBRID VEHICLE

INCORPORATION BY REFERENCE

The disclosure of Japanese Patent Application No. 2017-007656 filed on Jan. 19, 2017 including the specification, drawings and abstract is incorporated herein by reference in its entirety.

BACKGROUND

1. Technical Field

The present disclosure relates to a control device for a hybrid vehicle.

2. Description of Related Art

A hybrid vehicle, as a vehicle, includes an engine, a first motor and a second motor, and a planetary gear mechanism having a sun gear, a ring gear, a pinion gear, and a carrier. Output torque of the engine is transmitted to the carrier of the planetary gear mechanism.

Such a hybrid vehicle may set any of a hybrid traveling mode, a single motor drive electric traveling mode, and a dual motor drive electric traveling mode in accordance with requested drive power. In the hybrid traveling mode, the vehicle travels by at least the output torque of the engine. In the single motor drive electric traveling mode, the vehicle travels by output torque of the second motor. In the dual motor drive electric traveling mode, the vehicle travels by output torque of both of the first motor and the second motor.

It is known that the dual motor drive electric traveling mode is prohibited in the hybrid vehicle enabling the dual motor drive electric traveling mode, when the pinion temperature is higher than an upper limit temperature (refer to, for example, Japanese Unexamined Patent Application Publication No. 2016-107709 (JP 2016-107709 A)). Such a technology will be referred to as the related art.

SUMMARY

In the related art, when the dual motor drive electric traveling mode is permitted at the time of the pinion temperature being decreased to or below a lower limit temperature that is lower than the upper limit temperature, in order to prevent hunting between prohibiting and permitting of the dual motor drive electric traveling mode, traveling in the dual motor drive electric traveling mode is not performed until the dual motor drive electric traveling mode is permitted. Thus, fuel consumption may deteriorate.

The present disclosure provides a control device that can reduce the period of prohibiting a dual motor drive electric traveling mode in a hybrid vehicle capable of traveling in the dual motor drive electric traveling mode.

An aspect of the present disclosure relates to a control device for a hybrid vehicle. The hybrid vehicle includes an engine as a drive power source, a first motor as a drive power source, a second motor as a drive power source, a planetary gear mechanism, and a brake mechanism. The planetary gear mechanism includes a sun gear, a ring gear, a carrier to which output torque of the engine is transmitted, a pinion gear, and a pinion pin. The brake mechanism is configured to selectively stop rotation of the carrier. One of the sun gear and the ring gear is connected to the first motor. The other is connected to an output member that transmits power to a drive shaft side of the hybrid vehicle. The second motor is connected to the output member. The control device includes an electronic control unit that is configured as follows. The electronic control unit sets any traveling mode of a hybrid traveling mode, a single motor drive electric traveling mode, and a dual motor drive electric traveling mode in accordance with requested drive power. The hybrid traveling mode is a mode in which the hybrid vehicle travels by drive power including at least the output torque of the engine. The single motor drive electric traveling mode is a mode in which the hybrid vehicle travels by output torque of the second motor. The dual motor drive electric traveling mode is a mode in which the hybrid vehicle travels by output torque of both of the first motor and the second motor in a state where the rotation of the carrier is stopped by the brake mechanism. The electronic control unit prohibits setting of the dual motor drive electric traveling mode when a pinion temperature that is a temperature of the pinion gear or the pinion pin is higher than an upper limit temperature, and sets the hybrid traveling mode instead of the dual motor drive electric traveling mode. The electronic control unit releases the prohibition of the dual motor drive electric traveling mode when the pinion temperature is decreased to or below a release temperature lower than the upper limit temperature in a state where setting of the dual motor drive electric traveling mode is prohibited. The electronic control unit restricts output of the first motor in the dual motor drive electric traveling mode when the pinion temperature which is the temperature of the pinion gear or the pinion pin is higher than the upper limit temperature. The electronic control unit releases a state of restricting the output of the first motor when the pinion temperature is decreased to or below a lower limit temperature lower than the release temperature in the state of restricting the output of the first motor.

According to the aspect of the present disclosure, after the pinion temperature becomes higher than the upper limit temperature during traveling in the dual motor drive electric traveling mode, and the dual motor drive electric traveling mode is prohibited, the prohibition of the dual motor drive electric traveling mode is released when the pinion temperature becomes lower than or equal to the release temperature higher than the lower limit temperature before the pinion temperature is decreased to or below the lower limit temperature. Thus, the period of prohibiting the dual motor drive electric traveling mode can be shortened. When the prohibition of the dual motor drive electric traveling mode is released, the upper limit of the output of the first motor is restricted in the dual motor drive electric traveling mode. Thus, the recurrence of an increase in the pinion temperature above the upper limit temperature can be reduced.

In the control device according to the aspect of the present disclosure, the electronic control unit may be configured to set an upper limit of the output of the first motor to be smaller as the pinion temperature becomes higher. The configuration can more effectively reduce the recurrence of an increase in the pinion temperature above the upper limit temperature.

In the control device according to the aspect of the present disclosure, the electronic control unit may be configured to acquire driver's tendency to request drive power, and set the release temperature based on the driver's tendency to request drive power. The configuration can reduce the recurrence of an increase in the pinion temperature above the upper limit temperature with satisfaction of the drive power request of the driver when the output of the first motor is restricted at the time of releasing the prohibition of the dual motor drive electric traveling mode.

According to the aspect of the present disclosure, the period of prohibiting the dual motor drive electric traveling mode can be shortened in the hybrid vehicle capable of traveling in the dual motor drive electric traveling mode.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a block diagram illustrating a configuration of a control system of an ECU and the like;

FIG. 5 is a diagram illustrating one example of a temperature rise map Mup;

FIG. 6 is a diagram illustrating one example of a temperature fall map Mdw1;

FIG. 7 is a diagram illustrating one example of a temperature fall map Mdw2;

DETAILED DESCRIPTION OF EMBODIMENTS

Hereinafter, an embodiment of the present disclosure will be described based on the drawings.

First, one example of a hybrid vehicle to which a control device of the embodiment of the present disclosure is applied will be described with reference to FIG 1.

Figure 1:
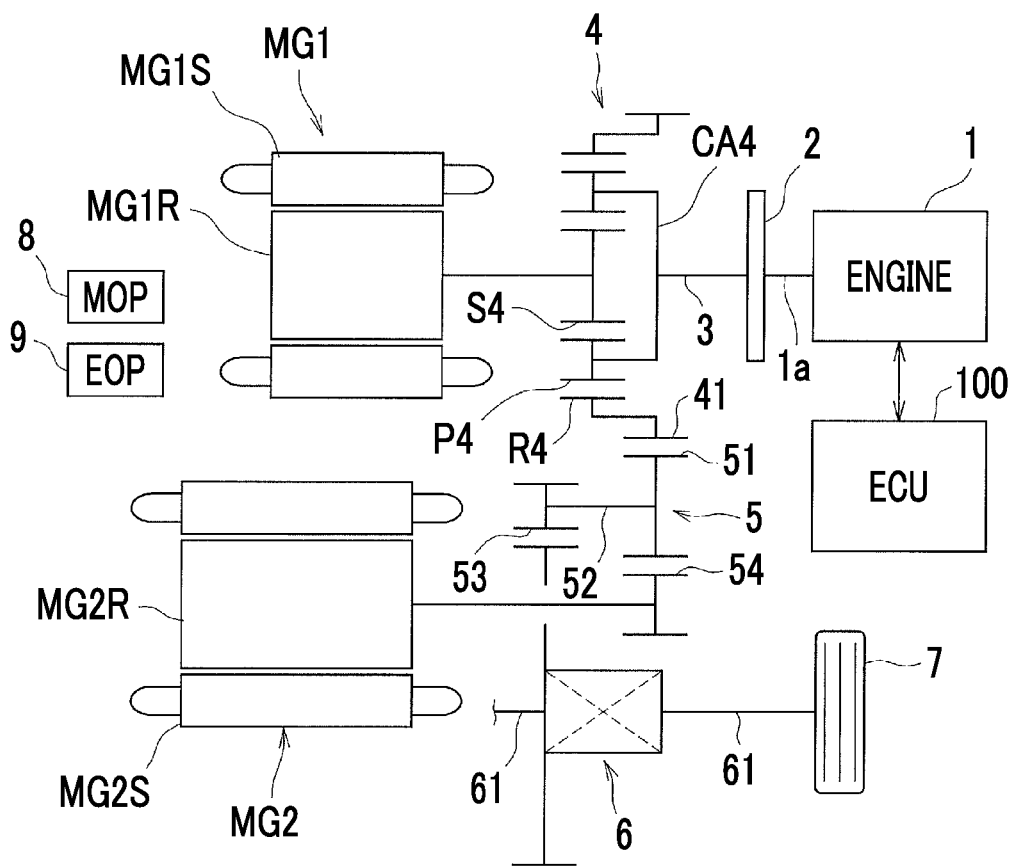
FIG. 1 is a schematic configuration diagram illustrating one example of a hybrid vehicle to which a control device of an embodiment of the present disclosure is applied.

A hybrid vehicle HV (hereinafter, referred to as the vehicle HV) illustrated in FIG. 1 is a front-engine front-drive (FF) vehicle and is a vehicle having an engine (internal combustion engine) 1, a first motor generator MG1, and a second motor generator MG2 as a drive power source. The vehicle ITV includes the engine 1, the first motor generator MG1, the second motor generator MG2, a one-way clutch 2, an input shaft 3, a planetary gear mechanism 4 functioning as a power split device, a gear mechanism 5, a differential device 6, a drive shaft 61, a drive wheel (front wheel) 7, a driven wheel (rear wheel; not illustrated), a mechanical oil pump (MOP) 8, an electric oil pump (EOP) 9, an electronic control unit (ECU) 100, and the like.

In the vehicle HV of the example, a rotating shaft of the first motor generator MG1 and a rotating shaft of the second motor generator MG2 are disposed on different axes.

The ECU 100 is configured with, for example, a hybrid (HV) ECU, an engine ECU, an MG_ECU, and a battery ECU. The ECUs are communicably connected to each other. The HV ECU, the engine ECU, the MG_ECU, the battery ECU, and the like may be individual configurations.

Next, each unit of the engine 1, the motor generators MG1, MG2, the planetary gear mechanism 4, the ECU 100, and the like will be described below.

Engine

The engine 1 is a well-known power device such as a gasoline engine or a diesel engine that outputs power by combusting fuel. For example, in the gasoline engine, an operating state such as a throttle opening degree of a throttle valve disposed in an intake channel (air intake amount), an injected fuel amount, and an ignition timing is configured to be controllable. The operating state of the engine 1 is controlled by the ECU 100. The ECU 100 executes various kinds of control including the air intake amount control, the injected fuel amount control, the ignition timing control, and the like for the engine 1.

An engine rotational speed sensor 101 (refer to FIG. 2) that detects the number of rotations of an output shaft (crankshaft) 1a is disposed in the engine 1. An output signal of the engine rotational speed sensor 101 is input into the ECU 100. The output shaft 1a of the engine 1 is connected to the input shaft 3 through the one-way clutch 2.

The mechanical oil pump 8 is connected to the engine 1. The mechanical oil pump 8 is driven by the engine 1 and generates a hydraulic pressure for lubrication (cooling). The vehicle HV of the present embodiment includes the electric oil pump 9. The electric oil pump 9 is disposed to secure a hydraulic pressure for lubrication (cooling) when the engine 1 is stopped.

One-Way Clutch

The one-way clutch 2 is a device that regulates the rotation of the engine 1. When the rotational direction of the output shaft 1a at the time of operation of the engine 1 is regarded as a positive direction, the one-way clutch 2 allows the rotation of the output shaft 1a in the positive direction and regulates the rotation of the output shaft 1a in the negative direction (reverse rotation of the engine 1).

As described below, the one-way clutch 2 functions as a brake mechanism that stops the rotation of the output shaft 1a (a carrier CA4 of the planetary gear mechanism 4) of the engine 1 when the vehicle HV travels by the output torque of both of the first motor generator MG1 and the second motor generator MG2 (travels in dual motor drive electric traveling mode (dual drive EV traveling mode)). The one-way dutch 2 is one example of a "brake mechanism" of the present disclosure.

Motor Generator

The first motor generator MG1 is an alternating current synchronous generator including a rotor MG1R that is configured with a permanent magnet supported rotatably relative to the input shaft 3, and a stator MG1S onto which three-phase windings are wound. The first motor generator MG1 functions as a generator and as a motor (a drive power source that generates drive power for traveling). The second motor generator MG2 is also an alternating current synchronous generator including a rotor MG2R configured with a permanent magnet, and a stator MG2S onto which three-phase windings are wound. The second motor generator MG2 functions as a motor (a drive power source that generates drive power for traveling) and as a generator.

The first motor generator MG1 is one example of a "first motor" of the present disclosure. The second motor generator MG2 is one example of a "second motor" of the present disclosure.

Figure 2:
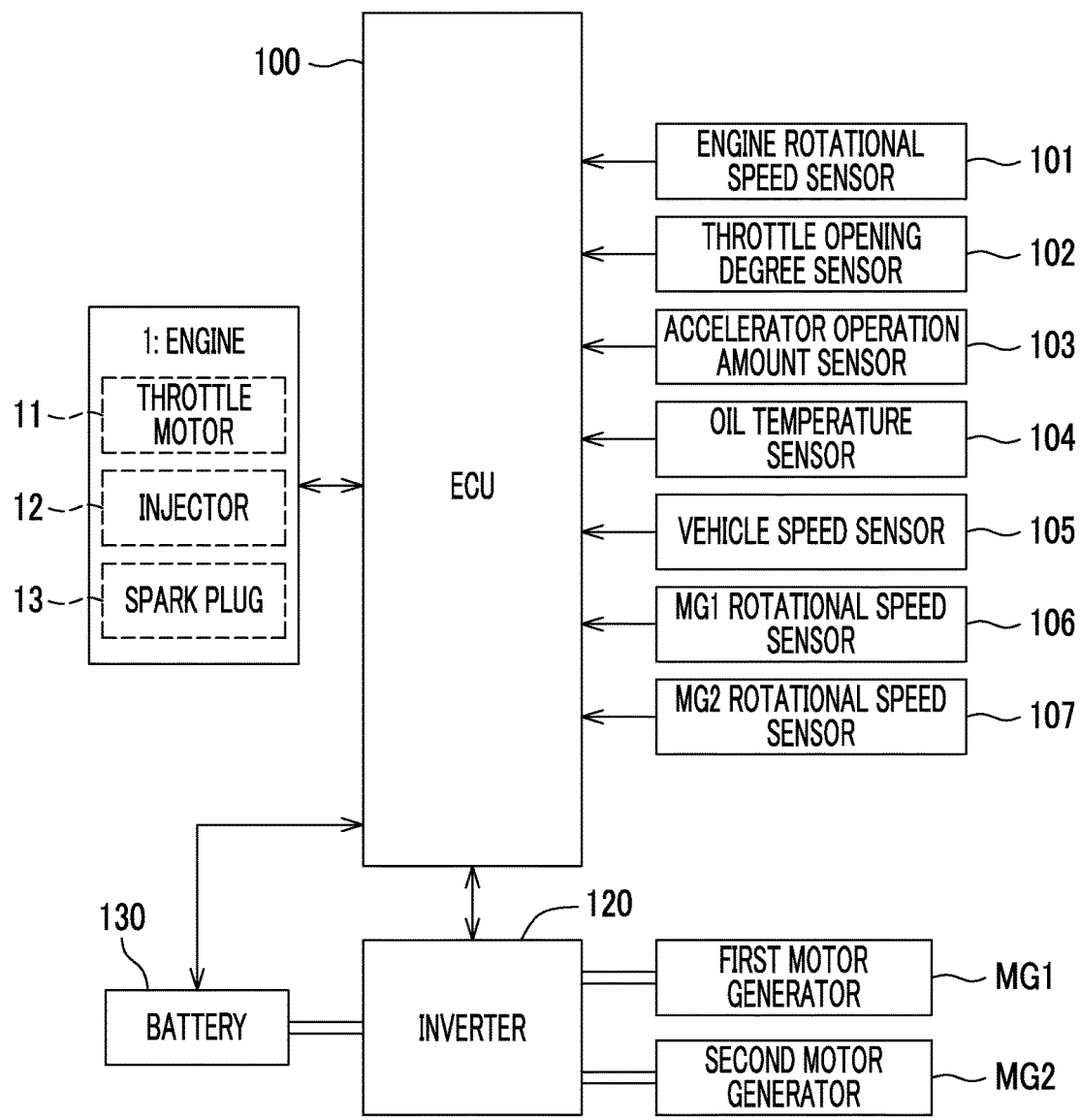

As illustrated in FIG. 2, the first motor generator MG1 and the second motor generator MG2 are connected to a battery (storage battery device) 130 through an inverter 120. The inverter 120 is controlled by the ECU 100, and regeneration or powering of each of the motor generators MG1, MG2 is set by controlling the inverter 120. The battery 130 is charged with regenerated electric power through the inverter 120. Electric power for driving each of the motor generators MG1, MG2 is supplied from the battery 130 through the inverter 120.

Planetary Gear Mechanism

As illustrated in FIG. 1, the planetary gear mechanism 4 has a sun gear S4, a pinion gear P4, a ring gear R4, and the carrier CA4. The sun gear S4 is an external gear that rotates at the center of a plurality of gear elements. The pinion gear P4 is an external gear that rotates and revolves around the sun gear S4 in circumscription with the sun gear S4. The ring gear R4 is an internal gear that is formed in a hollow annular shape to mesh with the pinion gear P4. The carrier CA4 supports the pinion gear P4 and rotates through the revolution of the pinion gear P4. The pinion gear P4 is rotatably supported by a pinion pin (not illustrated) that is held by the carrier CA4.

The carrier CA4 is connected to the input shaft 3 to be rotatable therewith as a single body. The sun gear S4 is connected to the rotor MG1R of the first motor generator MG1 to be rotatable therewith as a single body. A counter drive gear 41 is connected to the ring gear R4 to be rotatable therewith as a single body. The counter drive gear 41 is connected -to the drive shaft 61 (drive wheel 7) through a counter driven gear 51, a counter shaft 52, and a final gear 53 of the gear mechanism 5 and the differential device 6. The counter drive gear 41 is connected to the rotor MG2R of the second motor generator MG2 through a reduction gear 54 of the gear mechanism 5.

The counter drive gear 41 connected to the ring gear R4 is one example of an "output member" of the present disclosure.

ECU

The ECU 100 includes a central processing unit (CPU), a read-only memory (ROM), a random access memory (RAM), a backup RAM, and the like.

The ROM stores various control programs, maps, and the like. The maps are referenced when the various control programs arc executed. The CPU executes a calculation process based on the various control programs, the maps, and the like stored in the ROM. The RAM is a memory that temporarily stores a calculation result of the CPU, data input from each sensor, and the like. The backup RAM is a non-volatile memory storing data and the like that should be retained at the time of, for example, stopping the engine 1.

As illustrated in FIG. 2, the ECU 100 is connected with various sensors such as the engine rotational speed sensor 101, a throttle opening degree sensor 102, an accelerator operation amount sensor 103, an oil temperature sensor 104, a vehicle speed sensor 105, an MG1 rotational speed sensor 106, and an MG2 rotational speed sensor 107. The throttle opening degree sensor 102 detects the opening degree of the throttle valve. The accelerator operation amount sensor 103 detects the operation amount of an accelerator pedal. The oil temperature sensor 104 detects the temperature (oil temperature) of hydraulic oil (hydraulic oil for lubrication (cooling)) for a transaxle including the planetary gear mechanism 4. The vehicle speed sensor 105 outputs a signal corresponding to the vehicle speed of the vehicle HV. Signals from each of the sensors (includes switches) are input into the ECU 100.

The ECU 100 is connected with a throttle motor 11, an injector 12, a spark plug 13 (igniter), and the like. The throttle motor 11 drives the throttle valve of the engine 1 to open or close the throttle valve.

The ECU 100 executes various kinds of control including control of the opening degree of the throttle valve of the engine 1 (air intake amount control (drive control of the throttle motor 11)), the injected fuel amount control (open and close control of the injector 12), the ignition timing control (drive control of the spark plug 13), and the like for the engine 1 based on the output signals of the various sensors.

The ECU 100 calculates requested drive power by using the maps (or calculation formulas) or the like based on, for example, the accelerator operation amount acquired from the output signal of the accelerator operation amount sensor 103, and the vehicle speed acquired from the output signal of the vehicle speed sensor 105. The ECU 100 controls the output torque output by the engine 1, the output torque output by the first motor generator MG1 (hereinafter, referred to as MG1 torque), and the output torque output by the second motor generator MG2 such that the requested drive power is achieved. The ECU 100 executes a "pinion temperature estimation process", a "flag setting process", a "release temperature setting process", "traveling control", and the like described below.

Traveling Mode

The present embodiment can selectively execute a hybrid traveling mode (HV traveling mode) or an EV traveling mode. The HV traveling mode and the EV traveling mode are executed by the ECU 100.

The HV traveling mode is a traveling mode in which the vehicle HV travels by at least the output torque of the engine 1. In the HV traveling mode, the vehicle HV may travel by the output torque of the second motor generator MG2 in addition to the output torque of the engine 1.

In the HV traveling mode, the first motor generator MG1 outputs reaction force torque and thus, functions as a reaction force receiver with respect to the output torque of the engine 1. Accordingly, the output torque of the engine 1 is output from the ring gear R4 of the planetary gear mechanism 4 and is transmitted to the drive shaft 61 (drive wheel 7) through the counter drive gear 41, the counter driven gear 51, the counter shaft 52, the final gear 53, and the differential device 6.

The EV traveling mode is a traveling mode in which the vehicle HV travels by the output torque of the first motor generator MG1 and the output torque of the second motor generator MG2. EV traveling enables traveling with the engine 1 stopped.

The present embodiment has a single motor drive electric traveling mode (single drive EV traveling mode) and the dual drive EV traveling mode as a traveling mode in EV traveling. In the single drive EV traveling mode, the vehicle HV travels by the output torque of the second motor generator MG2. In the dual drive EV traveling mode, the vehicle HV travels by the output torque of both of the second motor generator MG2 and the first motor generator MG1.

In the single drive EV traveling mode, the rotational speed (number of rotations) of each of the carrier CA4 and the engine 1 is zero, and the requested drive power is achieved by the output torque of the second motor generator MG2.

In the dual drive EV traveling mode, the first motor generator MG1 as a motor is controlled to output torque by rotating in the negative direction (the opposite direction to the rotation direction of the output shaft 1a of the engine 1). The second motor generator MG2 as a motor is controlled to output torque by rotating in the positive direction. The vehicle HV travels by the output torque of the first motor generator MG1 and the output torque of the second motor generator MG2. In such a case, torque is applied to the output shaft 1a of the engine 1 in the negative direction, and the one-way clutch 2 is engaged. Accordingly, the vehicle HV can efficiently travel with higher output by the output torque of both of the first motor generator MG1 and the second motor generator MG2 in a state where the rotation of each of the output shaft 1a of the engine 1 and the carrier CA4 of the planetary gear mechanism 4 is stopped (fixed state).

Switching between the HV traveling mode, the single drive EV traveling mode, and the dual drive EV traveling mode is made by using the maps. Specifically, the ECU 100 selectively sets any traveling mode of the HV traveling mode, the single drive EV traveling mode, and the dual drive EV traveling mode by referencing a drive power map illustrated in FIG. 3 based on the requested drive power and the vehicle speed acquired from the output of the vehicle speed sensor 105. For example, when the operating point is within the region of the single drive EV traveling mode in the drive power map in FIG. 3, the single drive EV traveling mode is set. When the operating point transitions into the region of the dual drive EV traveling mode from such a state, the single drive EV traveling mode is switched to the dual drive EV traveling mode.

When, particularly, the dual drive EV traveling mode is set among the traveling modes of the HV traveling mode, the single drive EV traveling mode, and the dual drive EV traveling mode, the one-way clutch 2 is engaged, and the first motor generator MG1 and the second motor generator MG2 are rotated in opposite directions in a state where the rotation of each of the output shaft 1a of the engine 1 and the carrier CA4 of the planetary gear mechanism 4 is stopped. That is, in the planetary gear mechanism 4, the sun gear S4 and the ring gear R4 rotate in opposite directions in a state where the rotation of the carrier CA4 is stopped. Thus, the pinion gear P4 supported by the carrier CA4 rotates in a state where the revolution thereof about the sun gear S4 is stopped. The number of rotations of the pinion gear P4 is determined by the difference in number of rotations between the sun gear S4 and the ring gear R4. Since the sun gear S4 and the ring gear R4 rotate in opposite directions, the pinion gear P4 rotates at a high speed. When the number of rotations of the pinion gear P4 rises excessively, the temperature of the pinion gear P4 or the pinion pin (not illustrated) may rise excessively. Hereinafter, the temperature of the pinion gear P4 or the pinion pin (not illustrated) will be referred to as a pinion temperature.

Considering such a point, the present embodiment executes control that prohibits the dual drive EV traveling mode when the pinion temperature is higher than an upper limit temperature described below. Details of traveling control including the control of prohibiting the dual drive EV traveling mode will be described below.

Pinion Temperature Estimation Process

Next, the pinion temperature estimation process will be described with reference to a flowchart in FIG. 4. The process routine in FIG. 4 is repeatedly executed for each predetermined cycle in the ECU 100.

Figure 3:
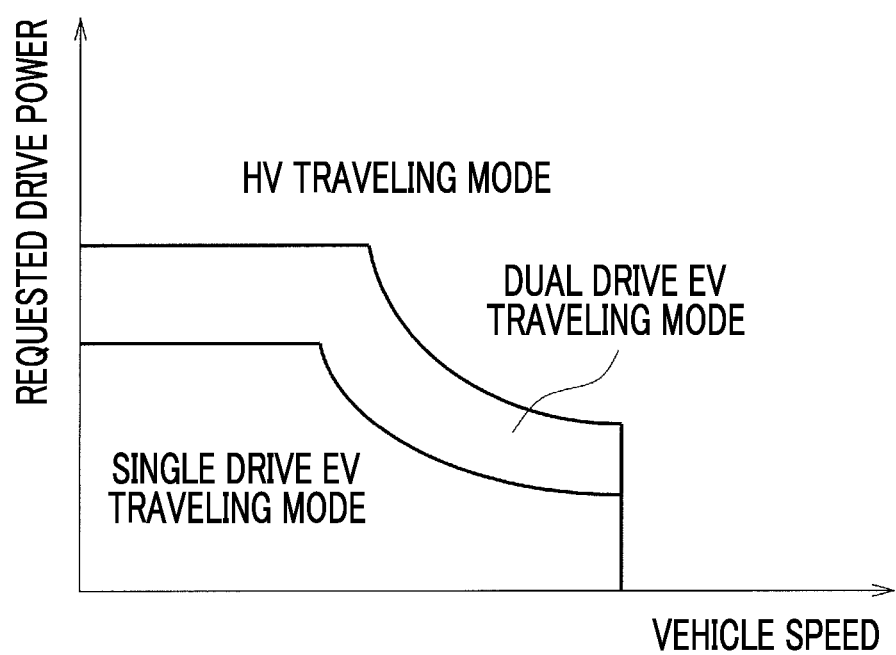
FIG. 3 is a diagram illustrating one example of a drive power map.
Figure 4:
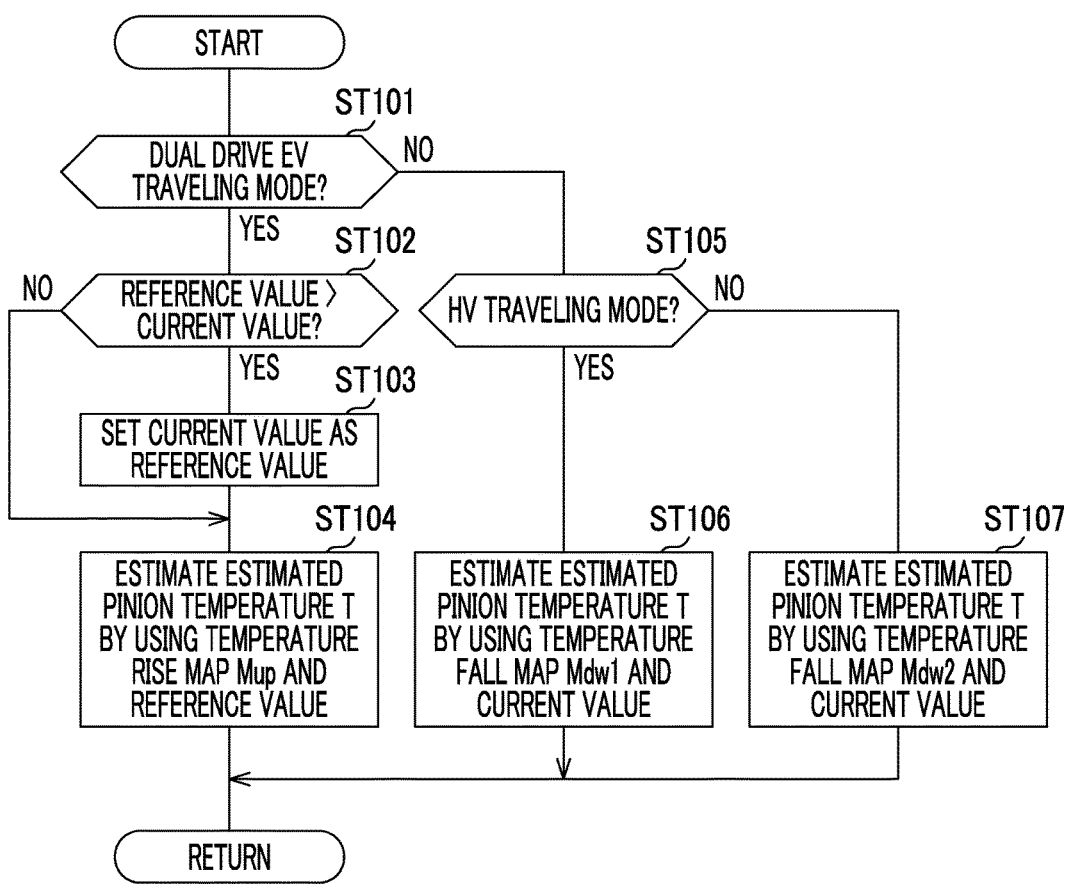
FIG. 4 is a flowchart illustrating one example of a pinion temperature estimation process executed by the ECU.

When the process routine in FIG. 4 is started, first, a determination as to whether or not the traveling mode is the dual drive EV traveling mode is performed in step ST101. Specifically, when the drive power map in FIG. 3 is referenced based on the requested drive power and the vehicle speed acquired from the output of the vehicle speed sensor 105, and the operating point is within the region of the dual drive EV traveling mode, a determination is made that the traveling mode is the dual drive EV traveling mode (positive determination (YES)). When the operating point is not within the region of the dual drive EV traveling mode, a determination is made that the traveling mode is not the dual drive EV traveling mode (negative determination (NO)). As described below, when a dual drive prohibition flag is ON, and the dual drive EV traveling mode is prohibited, the traveling mode is set to the HV traveling mode even when the operating point is within the region of the dual drive EV traveling mode. Thus, the determination result in step ST101 is a negative determination (NO).

When the determination result in step ST101 is a positive determination (YES), a transition is made to step ST102. Processes in step ST102 and onward will be described below. When the determination result in step ST101 is a negative determination (NO), a transition is made to step ST105.

In step ST105, a determination as to whether or not the traveling mode is the HV traveling mode is performed. The determination also references the drive power map in FIG. 3 based on the requested drive power and the vehicle speed acquired from the output of the vehicle speed sensor 105. When the determination result in step ST105 is a positive determination (YES), a transition is made to step ST106.

In step ST106, an estimated pinion temperature T is estimated by using the current value of the estimated pinion temperature and a temperature fall map Mdw1 in FIG. 6. Specifically, the estimated pinion temperature T that falls in the HV traveling mode is estimated by successively adding the amount of fall in temperature ([−b]×time period of one execution of the process routine) calculated from a temperature fall gradient [−b] (the amount of fall in temperature per unit time period) in the temperature fall map Mdw1 in FIG. 6 to the current value of the estimated pinion temperature for each execution of the process routine.

The temperature fall map Mdw1 illustrated in FIG. 6 is acquired by mapping the temperature fall gradient [−bij] with the oil temperature and an engine rotational speed (the number of rotations of the mechanical oil pump 8) as a parameter. The temperature fall gradient [−bij] is acquired by experiment, simulation, or the like. The temperature fall map Mdw1 is stored in the ROM of the ECU 100. The current temperature fall gradient [−b] can be acquired by using the temperature fall map Mdw1 based on the oil temperature acquired from the output of the oil temperature sensor 104, and the engine rotational speed acquired from the output of the engine rotational speed sensor 101.

When the determination result in step ST105 is a negative determination (NO), that is, when the traveling mode is the single drive EV traveling mode, a transition is made to step ST107.

In step ST107, the estimated pinion temperature T is estimated by using the current value of the estimated pinion temperature and a temperature fall map Mdw2 in FIG. 7. Specifically, the estimated pinion temperature T that falls in the single drive EV traveling mode is estimated by successively adding the amount of fall in temperature ([−c]×time period of one execution of the process routine) calculated from a temperature fall gradient [−c] (the amount of fall in temperature per unit time period) in the temperature fall map Mdw2 in FIG. 7 to the current value of the estimated pinion temperature for each execution of the process routine.

The temperature fall map Mdw2 illustrated in FIG. 7 is acquired by mapping the temperature fall gradient [−cij] with the oil temperature and an EOP rotational speed (the number of rotations of the electric oil pump 9) as a parameter. The temperature fall gradient [−cij] is acquired by experiment, simulation, or the like. The temperature fall map Mdw2 is stored in the ROM of the ECU 100. The current temperature fall gradient [−c] can be acquired by using the temperature fall map Mdw2 based on the EOP rotational speed (instruction value) and the oil temperature acquired from the output of the oil temperature sensor 104.

When the determination result in step ST101 is a positive determination (YES), that is, when the traveling mode is the dual drive EV traveling mode, a transition is made to step ST102.

In step ST102, a determination as to whether or not a reference value is higher than the current value of the estimated pinion temperature is performed. For the reference value, a temperature at which the pinion temperature is the highest at the operating point in the HV traveling mode and the single drive EV traveling mode is acquired in advance by experiment, simulation, or the like. The reference value is acquired by adding a margin to the temperature of the highest pinion temperature.

When the determination result in step ST102 is a positive determination (YES) (when [reference value>current value] is established), the current value is set as the reference value in step ST103, and a transition is made to step ST104. When the determination result in step ST102 is a negative determination (NO) (when [reference value≤current value] is established), a transition is made to step ST104 from the state (without changing the reference value).

In step ST104, the estimated pinion temperature T is estimated by using the reference value and a temperature rise map Mup in FIG. 5. Specifically, the estimated pinion temperature T that rises in the dual drive EV traveling mode is estimated by successively adding a rise in temperature (a×time period of one execution of the process routine) calculated from a temperature rise gradient a (a rise in temperature per unit time period) in the temperature rise map Mup in FIG. 5 to the current value of the estimated pinion temperature for each execution of the process routine.

The temperature rise map Mup illustrated in FIG. 5 is acquired by mapping the temperature rise gradient aij with the MG1 torque and an MG1 rotational speed (the number of rotations of the first motor generator MG1) as a parameter. The temperature rise gradient aij is acquired by experiment, simulation, or the like. The temperature rise map Mup is stored in the ROM of the ECU 100. The current temperature rise gradient a can be acquired by using the temperature rise map Mup based on the MG1 torque (instruction value) and the MG1 rotational speed acquired from the output of the MG1 rotational speed sensor 106.

The estimated pinion temperature T estimated as above is one example of a "pinion temperature" of the present disclosure.

Flag Setting Process

Next, a process of setting each flag of the dual drive prohibition flag and an MG1 output restriction flag to ON/OFF will be described with reference to a flowchart in FIG. 8. The dual drive prohibition flag is used to prohibit the dual drive EV traveling mode. The MG1 output restriction flag is used to restrict the upper limit of the output of the first motor generator MG1 (hereinafter, referred to as the MG1 output).

Figure 8:
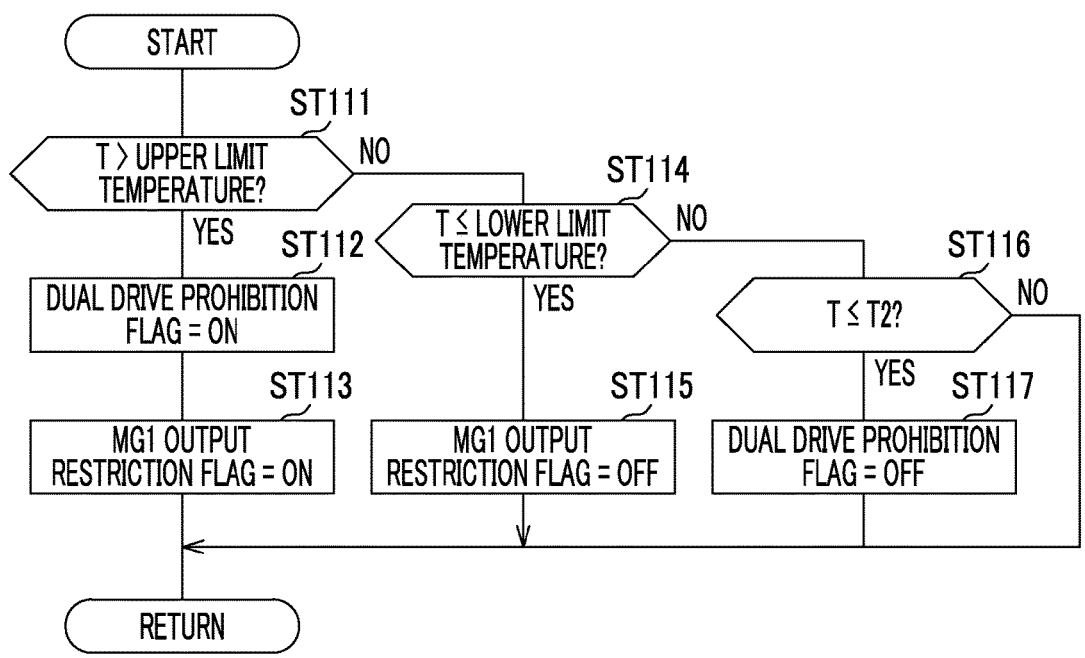
FIG. 8 is a flowchart illustrating one example of a flag setting process executed by the ECU.

The process routine in FIG. 8 is repeatedly executed for each predetermined cycle in the ECU 100. In the execution of the process routine, the ECU 100 performs processes based on the estimated pinion temperature T that is estimated in the process routine in FIG. 4.

When the process routine in FIG. 8 is started, first, a determination as to whether or not the estimated pinion temperature T is higher than the upper limit temperature is performed in step ST111. The upper limit temperature used in the determination process of step ST111 is, for example, a temperature that is acquired from the upper limit value (acquired by experiment or simulation) of a temperature at which the durability or the like of the pinion gear P4 and the pinion pin can be secured during traveling in the dual drive EV traveling mode, considering a predetermined safety factor.

When the determination result in step ST111 is a positive determination (YES) (when the estimated pinion temperature T is higher than the upper limit temperature), the dual drive prohibition flag is set to ON in step ST112. The MG1 output restriction flag is set to ON in step ST113. Then, a return is made. The initial value of each flag of the dual drive prohibition flag and the MG1 output restriction flag is "OFF".

When the determination result in step ST111 is a negative determination (NO) (when the estimated pinion temperature T is lower than or equal to the upper limit temperature), a transition is made to step ST114. In step ST114, a determination as to whether or not the estimated pinion temperature T is lower than or equal to a lower limit temperature is performed. The lower limit temperature used in the determination process of step ST114 is a temperature at which the first motor generator MG1 can output 100% of the output thereof in traveling in the dual drive EV traveling mode. The lower limit temperature is set to a value acquired by experiment, simulation, or the like.

When the determination result in step ST114 is a positive determination (YES) (when the estimated pinion temperature T is lower than or equal to the lower limit temperature), the MG1 output restriction flag is set to OFF in step ST115. Then, a return is made.

When the determination result in step ST114 is a negative determination (NO) (when the estimated pinion temperature T is higher than the lower limit temperature), a transition is made to step ST116. In step ST116, a determination as to whether or not the estimated pinion temperature T is lower than or equal to a release temperature T2 is performed. The release temperature T2 used in the determination process of step ST116 will be described below.

When the determination result in step ST116 is a negative determination (NO) (when [T>T2] is established), a return is made. When the determination result in step ST116 is a positive determination (YES) (when [T≤T2] is established), a transition is made to step ST117. In step ST117, the dual drive prohibition flag is set to OFF. Then, a return is made.

Release Temperature Setting Process

Next, a process of setting the release temperature will be described with reference to a flowchart in FIG. 9. The release temperature is a temperature at which the prohibition of the dual drive EV traveling mode (hereinafter, referred to as dual drive prohibition) is released. The process routine is executed in the ECU 100.

Figure 9:
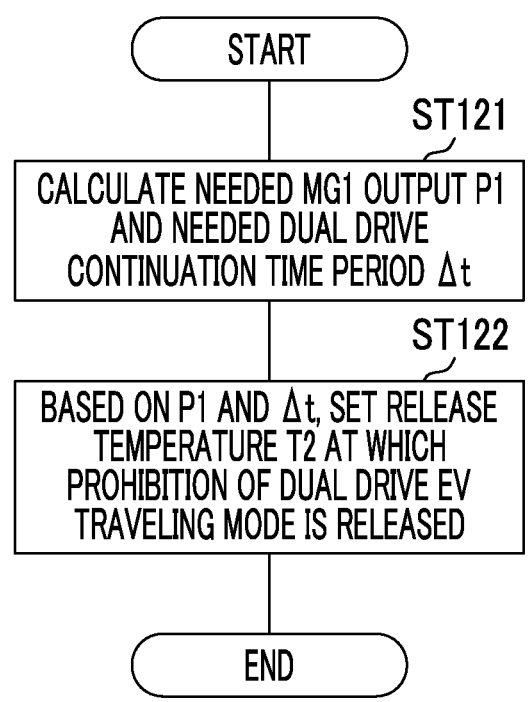
FIG. 9 is a flowchart illustrating one example of a release temperature setting process executed by the ECU.

The process routine in FIG. 9 is started when the estimated pinion temperature T reaches the upper limit temperature described below during traveling in the dual drive EV traveling mode (when the prohibition of the dual drive EV traveling mode is started), in the execution of the process routine, the ECU 100 executes each process based on the estimated pinion temperature T that is estimated in the process routine in FIG. 4.

When the process routine in FIG. 9 is started, needed MG1 output P1 and a needed dual drive continuation time period Δt are calculated in step ST121. Hereinafter, each calculation process will be described.

Needed MG1 Output P1

Figure 10:
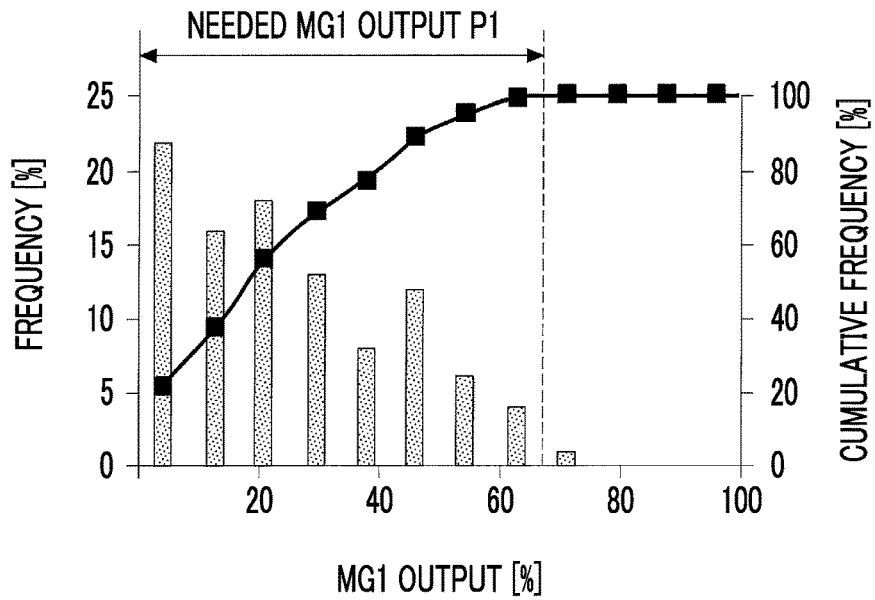
FIG. 10 is a diagram illustrating one example of an MG1 output frequency distribution.

During traveling in the dual drive EV traveling, mode, the ECU 100 learns and accumulates the frequency of each output (a ratio [%] to the maximum output; hereinafter, referred to as MG1 output [%]) of the first motor generator MG1 when the first motor generator MG1 is used for a predetermined time period (for example, used for 100 hours). The ECU 100 calculates the needed MG1 output P1 [%] from the output frequency (hereinafter, referred to as an MG1 output frequency distribution) of the first motor generator MG1. Specifically, for example, when the MG1 output frequency distribution resulting from a certain driver is the frequency distribution illustrated in FIG. 10, the needed MG1 output P1 [%] is the output of the first motor generator MG1 of which the cumulative frequency [%] is equal to a value in which a margin with respect to 100 [%] is considered (for example, 98% considering a variation or the like in the frequency of the output) in FIG. 10.

Needed Dual Drive Continuation Time Period Δt

Figure 11:
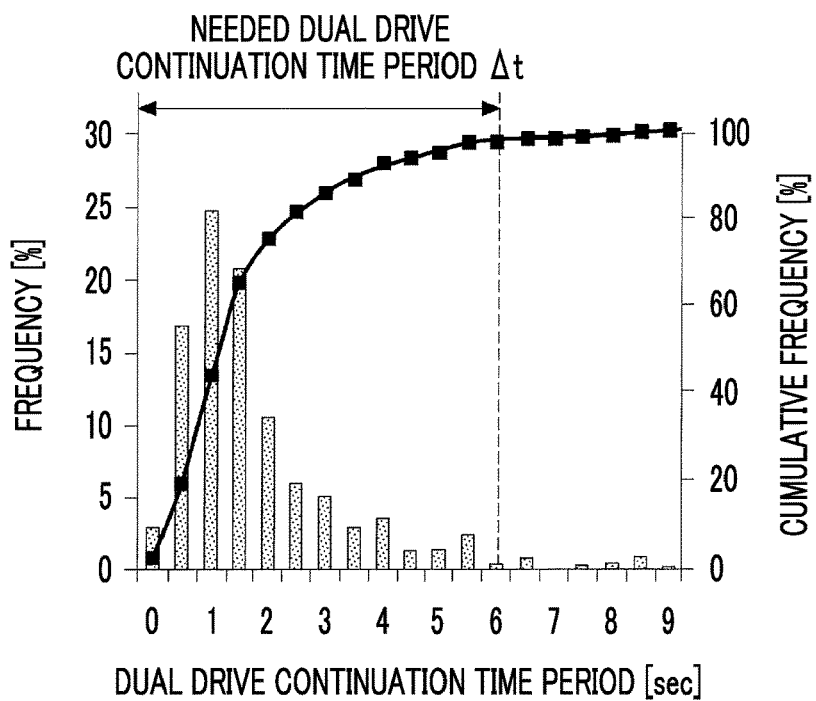
FIG. 11 is a diagram illustrating one example of a frequency distribution of a dual drive continuation time period.

The ECU 100 learns and accumulates the frequency [%] of a traveling continuation time period in the dual drive EV traveling mode (hereinafter, referred to as a dual drive continuation time period [see]), and calculates the needed dual drive continuation time period Δt [sec] from the frequency distribution of the dual drive continuation time period. Specifically, for example, when the frequency distribution of the dual drive continuation time period resulting from a certain driver is the frequency distribution illustrated in FIG. 11, the needed dual drive continuation time period Δt [see] is set to the dual drive continuation time period of which the cumulative frequency [%] is equal to a value in which a margin with respect to 100 [%] is considered (for example, 98% considering a variation or the like in the frequency of the continuation time period) in FIG. 11.

Release Temperature T2

Next, in step ST122, the release temperature T2 at which the prohibition of the dual drive EV traveling mode is released is set based on the needed MG1 output P1 [%] and the needed dual drive continuation time period Δt [sec]. A method of setting the release temperature 12 will be described with reference to FIG. 12.

Figure 12:
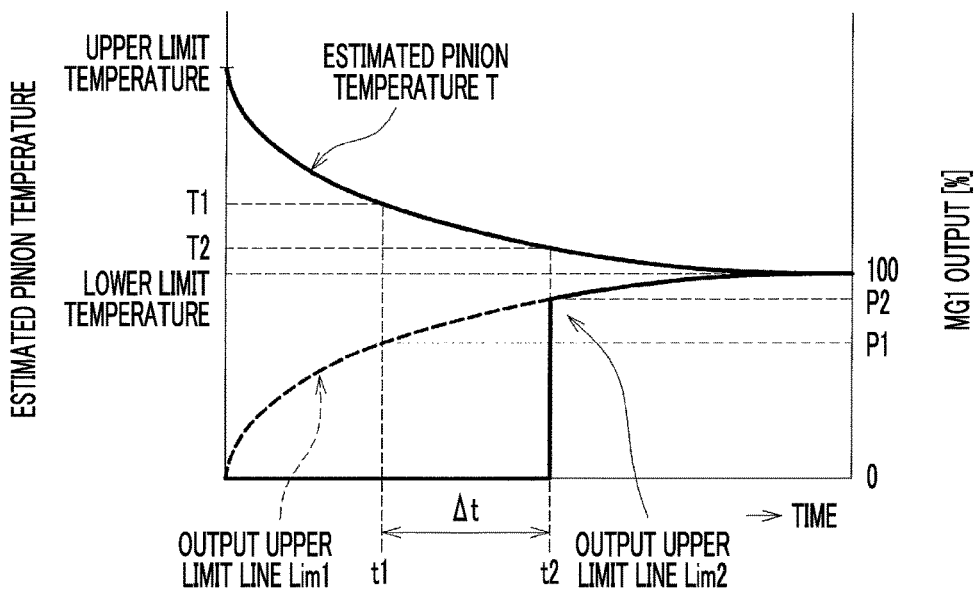
FIG. 12 is a diagram illustrating an estimated pinion temperature and an output upper limit line.

FIG. 12 is a diagram illustrating a relationship between the estimated pinion temperature T and output upper limit lines Lim1, Lim2. The estimated pinion temperature T is the temperature estimated in the process routine in FIG. 4. The estimated pinion temperature T falls after the estimated pinion temperature T reaches the upper limit temperature (refer to FIG. 15). Such a fall in the estimated pinion temperature T occurs when the dual drive EV traveling mode is prohibited and is switched to the HV traveling mode after the estimated pinion temperature T reaches the upper limit temperature. When the estimated pinion temperature T becomes lower than the upper limit temperature, the MG1 output [%] can be increased by an amount corresponding to the decrease in the estimated pinion temperature 1.

The output upper limit lines Lim1 (broken line), Lim2 (a curved part of a solid line) illustrated in FIG. 12 define the upper limit of the MG1 output [%] with the MG1 output [%] as a parameter of the vertical axis, considering the fact that the MG1 output [%] can be increased by an amount corresponding to the decrease in the estimated pinion temperature T. In the output upper limit lines Lim1 (broken line), Lim2 (a curved part of a solid line), the restricted value of the MG1 output when the estimated pinion temperature T is equal to the upper limit temperature is set to 0 [%], and the restricted value of the MG1 output when the estimated pinion temperature T is equal to the lower limit temperature is set to 100 [%]. The restricted value of the MG1 output [%] from 0 [%] to 100 [%] is set to be increased in accordance with a change (fall) in the estimated pinion temperature T.

The estimated pinion temperature T and the output upper limit lines Lim1, Lim2 are used to calculate t1. Specifically, a temperature T1 and t1 are acquired based on the output upper limit lines Lim1 (broken line), Lim2 (a curved part of a solid line) and the estimated pinion temperature T as illustrated in FIG. 12, by using the needed MG1 output P1 [%] calculated in the process of step ST121. The temperature T1 is a temperature at which the first motor generator MG1 can be used at the needed MG1 output [%] when the estimated pinion temperature T falls to the temperature T1.

Next, t2 (t1+Δt) illustrated in FIG. 12 is acquired from t1 acquired as above and the needed dual drive continuation time period Δt [sec] calculated in the process of step ST121, and T2 is acquired from t2 and the estimated pinion temperature T. The release temperature T2 is set to the acquired T2. The upper limit of the MG1 output [%] at t2 is P2.

Figure 13:
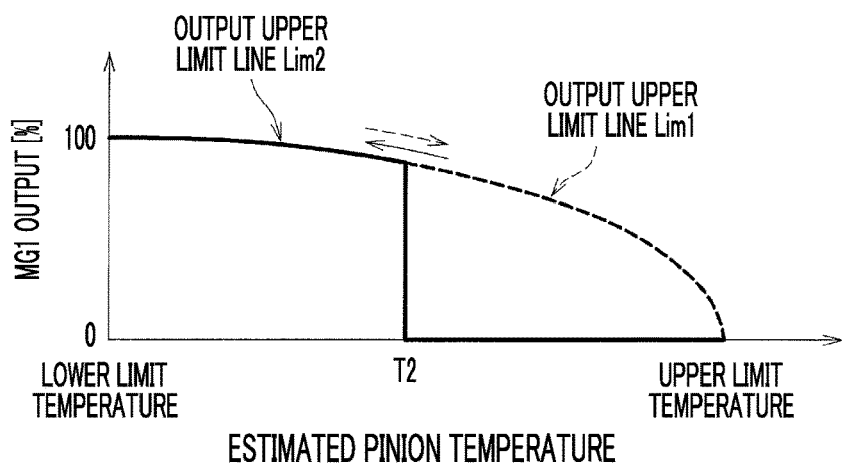
FIG. 13 is a diagram illustrating an output upper limit line.

The output upper limit lines Lim1, Lim2 having the estimated pinion temperature as a parameter of the horizontal axis and the MG1 output [%] as a parameter of the vertical axis are illustrated in FIG. 13 in order to help understanding of the relationship between the estimated pinion temperature (the upper limit temperature, the lower limit temperature, and the release temperature T2) and the output upper limit lines Lim1, Lim2. As illustrated in FIG. 13, the output upper limit lines Lim1 (broken line), Lim2 (a curved part of a solid line) are restricted output lines hi which the MG1 output [%] is restricted such that the upper limit of the MG1 output [%] is decreased as the estimated pinion temperature T is higher.

As illustrated in FIG. 13 and FIG. 12, the release temperature T2 is a temperature lower than the upper limit temperature, and the lower limit temperature is a temperature lower than the release temperature T2.

As above, by setting the release temperature 12 at which the dual drive prohibition is released, based on the needed MG1 output P1 [%] and the needed dual drive continuation time period Δt [sec], the pinion temperature may not rise to the upper limit temperature even when traveling with dual drive (traveling in the dual drive EV traveling mode) is performed for the needed dual drive continuation time period Δt (for example, 6 sec while satisfying the needed MG1 output P1 (for example, 65%) after the dual drive prohibition is released.

The needed MG1 output P1 [%] and the needed dual drive continuation time period Δt [sec] are one example of "driver's tendency to request drive power" of the present disclosure.

Execution of step ST121 and step S1122 in FIG. 9 by the ECU 100 realizes a "drive power request tendency acquisition unit" and a "release temperature setting unit" of the present disclosure.

Traveling Control

Next, traveling control including the control of prohibiting the dual drive EV traveling mode will be described with reference to a flowchart in FIG. 14 and timing charts in FIG. 15 and FIG. 16.

Figure 14:
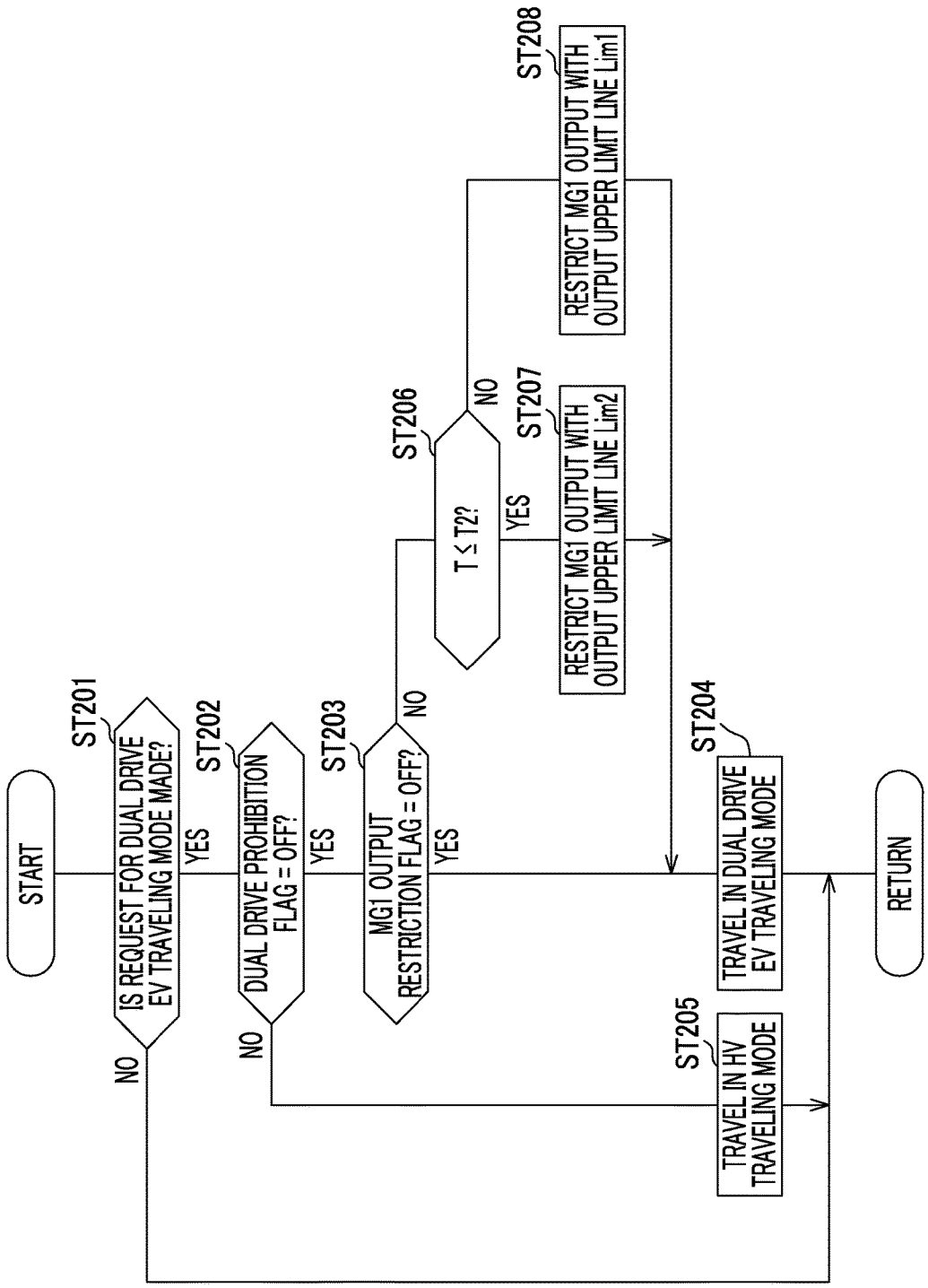
FIG. 14 is a flowchart illustrating one example of traveling control executed by the ECU.

The control routine in FIG. 14 is repeatedly executed for each predetermined cycle in the ECU 100. In the execution of the control routine, the ECU 100 performs control based on the estimated pinion temperature T estimated in the process routine in FIG. 4, and ON OFF of each flag set in the process routine in FIG. 8.

When the control routine in FIG. 14 is started, first, a determination as to whether or not a request for the dual drive EV traveling mode (hereinafter, referred to as a dual drive request) is made is performed in step ST201. Specifically, a determination as to whether or not the current operating point is within the region of the dual drive EV traveling mode is performed by referencing the drive power map in FIG. 3 based on the requested drive power and the vehicle speed acquired from the output of the vehicle speed sensor 105. When the determination result is a negative determination (NO), a return is made. When the determination result in step ST201 is a positive determination (YES), a transition is made to step ST202.

In step ST202, a determination as to whether or not the dual drive prohibition flag for prohibiting the dual drive EV traveling mode is OFF is performed. When the determination result is a positive determination (YES) (when [dual drive prohibition flag=OFF] is established), a transition is made to step ST203.

In step ST203, a determination as to whether or not the MG1 output restriction flag for restricting the upper limit of the MG1 output [%] is OFF is performed. When the determination result is a negative determination (NO) (when [MG1 output restriction flag=ON] is established), a transition is made to step ST206. Processes in step ST206 and onward will be described below.

When the determination result in step ST203 is a positive determination (YES) (when [MG1 output restriction flag=OFF] is established), that is, when the determination result in step ST201 is a positive determination (YES), and the determination results in step ST202 and step ST203 are positive determinations (YES), a transition is made to step ST204. In step ST204, the vehicle HV travels in the dual drive EV traveling mode.

Figure 15:
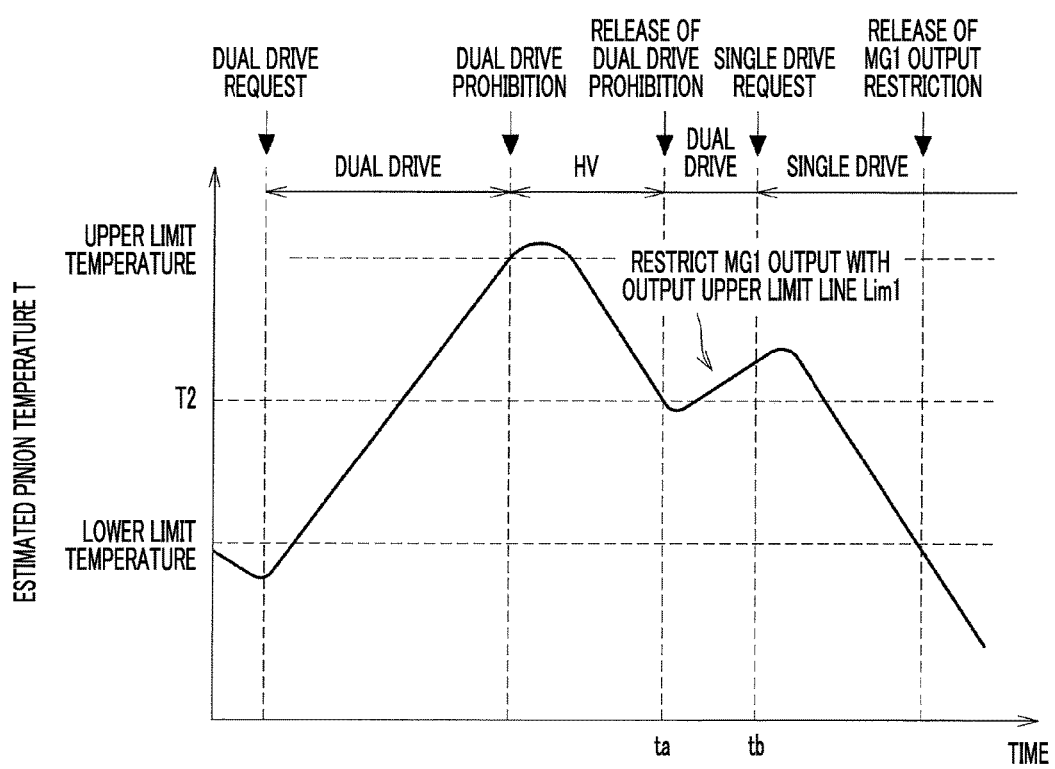
FIG. 15 is a timing chart illustrating a change in the estimated pinion temperature.

When the vehicle HV travels in the dual drive EV traveling mode, the estimated pinion temperature T gradually rises after the dual drive request as illustrated in FIG. 15. In FIG. 15 (FIG. 16), the dual drive EV traveling mode is described as "dual drive".

When the estimated pinion temperature T that rises due to traveling in the dual drive EV traveling mode becomes higher than the upper limit temperature, the dual drive prohibition flag and the MG1 output restriction flag are set to ON (the processes in step ST111 (YES) to step ST113 of the process routine in FIG. 8).

When the dual drive prohibition flag is set to ON, dual drive EV traveling mode is prohibited even in a state where a dual drive request is made (even when the determination result in step ST201 is a positive determination (YES)). When the dual drive prohibition flag is set to ON, the determination result in step ST202 is a negative determination (NO), and a transition is made to step ST205. In step ST205, the vehicle HV travels in the HV traveling mode.

While the determination result in step ST201 is a positive determination (YES), and the determination result in step ST202 is a negative determination (NO), traveling continues in the HV traveling mode, and the estimated pinion temperature T gradually falls as illustrated in FIG. 15. In FIG. 15 (FIG. 16), the HV traveling mode is described as "HV".

Next, when the estimated pinion temperature T that falls due to traveling in the HV traveling mode becomes lower than or equal to the release temperature T2, the dual drive prohibition flag is set to OFF (the processes in step ST116 (YES) and step ST117 of the process routine in FIG. 8). At such a time point (the time point of ta in FIG. 15), the dual drive prohibition is released as illustrated in FIG. 15, and traveling is performed in the dual drive EV traveling mode. At such a time point, the MG1 output restriction flag is ON. Thus, even when the estimated pinion temperature T becomes lower than or equal to the release temperature T2 (the dual drive prohibition flag is set to OFF), and the determination result in step ST202 is a positive determination (YES), the determination result in step ST203 is a negative determination (NO), and a transition is made to step ST206.

When the estimated pinion temperature T is lower than or equal to the release temperature T2, the determination result in step ST206 is a positive determination (YES). Thus, a transition is made to step ST207, and the upper limit of the MG1 output [%] is restricted with the output upper limit line Lim2 illustrated in FIG. 13. Restricting the upper limit of the MG1 output [%] with the output upper limit line Lim2 reduces a rise in the estimated pinion temperature T.

Then, when the estimated pinion temperature T rises, and the estimated pinion temperature T becomes higher than the release temperature T2, the determination result in step ST206 is a negative determination (NO), and a transition is made to step ST208. In step ST208, the upper limit of the MG1 output [%] is restricted with the output upper limit line Lim1 illustrated in FIG. 13 in the state of the dual drive EV traveling mode. Restricting the upper limit of the MG1 output [%] with the output upper limit line Lim1 reduces a rise in the estimated pinion temperature T (refer to FIG. 15).

When the current operating point enters, for example, the region of the single drive EV traveling mode in the state of traveling in the dual drive EV traveling mode (the upper limit of the MG1 output [%] is restricted), and a request for the single drive EV traveling mode (single drive request) is made (the time point of tb in FIG. 15), traveling transitions to the single drive EV traveling mode. At such a time point, the determination result in step ST201 is a negative determination (NO). The MG1 output restriction flag is still ON. When traveling is performed in the single drive EV traveling mode, the estimated pinion temperature T gradually falls as illustrated in FIG. 15. When the estimated pinion temperature T becomes lower than or equal to the lower limit temperature due to continuous traveling in the single drive EV traveling mode, the MG1 output restriction flag is set to OFF (the processes in step ST114 (YES) and step ST115 of the process routine in FIG. 8), and the restriction on the upper limit of the MG1 output [%] is released.

Figure 16:
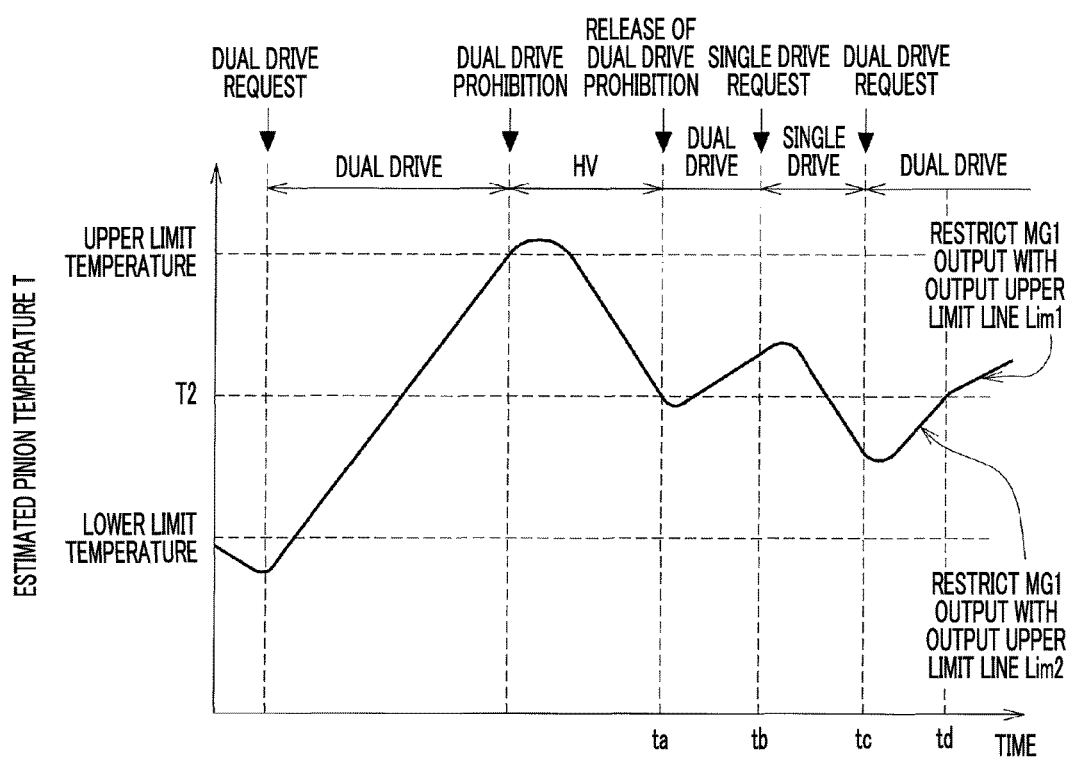
FIG. 16 is a timing chart illustrating a change in the estimated pinion temperature.

As illustrated in FIG. 16, when the current operating point enters the region of the dual drive EV traveling mode after traveling transitions to the single drive EV traveling mode from the time point of tb (the time point at which the single drive request is made), and a dual drive request is made (the time point of tc in FIG. 16), the determination result in step ST201 is a positive determination (YES). At such a time point, the estimated pinion temperature T is lower than or equal to the release temperature T2, and the dual drive prohibition flag is set to OFF (the processes in step ST116 (YES) and step ST117 of the process routine in FIG. 8). The MG1 output restriction flag is ON. Accordingly, traveling transitions to the dual drive EV traveling mode (the upper limit of the MG1 output [%] is restricted) from the time point of tc in FIG. 16. The processes in step ST206 and onward are executed in the control routine in FIG. 14.

The estimated pinion temperature T is lower than or equal to the release temperature T2 at the time point of tc in FIG. 16. Thus, the upper limit of the MG1 output [%] is restricted with the output upper limit line Lim2 illustrated in FIG. 13 (the processes in step ST206 (YES) and step ST207 of the control routine in FIG. 14), and a rise in the estimated pinion temperature T is reduced during traveling in the dual drive EV traveling mode.

Then, when the estimated pinion temperature T rises due to traveling in the dual drive EV traveling mode, and the estimated pinion temperature T becomes higher than the release temperature T2 (refer to a broken line arrow in FIG. 13), the upper limit of the MG1 output [%] is restricted with the output upper limit line Lim1 illustrated in FIG. 13 (the processes in step ST206 (NO) to step ST208 of the control routine in FIG. 14) from the time point (the time point of td in FIG. 16), and a rise in the estimated pinion temperature T is reduced during traveling in the dual drive EV traveling mode.

Then, when the estimated pinion temperature T becomes higher than the upper limit temperature due to traveling in the dual drive EV traveling mode, the dual drive prohibition flag is set to ON, and the dual drive EV traveling mode is prohibited. Traveling transitions to the HV traveling mode. When the current operating point enters, for example, the region of the single drive EV traveling mode during traveling in the dual drive EV traveling mode (the upper limit of the MG1 output [%] is restricted) after the time point of td in FIG. 16, and a request for the single drive EV traveling triode (single drive request) is made, traveling transitions to the single drive EV traveling mode. When the estimated pinion temperature T becomes lower than or equal to the lower limit temperature due to continuous traveling in the single drive EV traveling mode, the MG1 output restriction flag is set to OFF, and the restriction on the upper limit of the MG1 output [%] is released.

Execution of step ST201 to step ST208 in FIG. 14 and step ST111 to step ST117 in FIG. 8 by the ECU 100 realizes a "dual drive EV traveling mode prohibition unit", a "motor output restriction unit", and a "motor output restriction release unit" of the present disclosure.

Effect

As described heretofore, according to the present embodiment, after the estimated pinion temperature T becomes higher than the upper limit during traveling in the dual drive EV traveling mode, and the dual drive EV traveling mode is prohibited, the prohibition of the dual drive EV traveling mode is released when the estimated pinion temperature T becomes lower than or equal to the release temperature T2 higher than the lower limit temperature before the estimated pinion temperature T is decreased to or below the lower limit temperature. Thus, the period of prohibiting the dual drive EV traveling mode can be shortened. Accordingly, fuel consumption can be improved further than in the related art.

When the prohibition of the dual drive EV traveling mode is released, the upper limit of the output of the first motor generator MG1 is restricted in the dual drive EV traveling mode. Thus, the recurrence of an increase in the estimated pinion temperature T above the upper limit temperature can be reduced. The output of the first motor generator MG1 is restricted such that the upper limit of the output of the first motor generator MG1 is decreased as the estimated pinion temperature T is higher. Thus, the recurrence of an increase in the estimated pinion temperature T above the upper limit temperature can be more effectively reduced.

The present embodiment sets the release temperature T2 at which the dual drive prohibition is released, based on the needed MG1 output P1 [%] and the needed dual drive continuation time period Δt [sec] which indicate driver's tendency to request drive power. Thus, the recurrence of an increase in the estimated pinion temperature T above the upper limit temperature can be reduced with satisfaction of the drive power request of the driver.

OTHER EMBODIMENTS

The embodiment disclosed here is for illustrative purposes in every aspect and is not intended to restrict interpretation of the present disclosure. Accordingly, the technical scope of the present disclosure is not interpreted by the embodiment and is determined based on the disclosure of the claims. The technical scope of the present disclosure includes every change made within the equivalent meaning and scope of the claims.

For example, while the embodiment sets the release temperature T2 at which the prohibition of the dual drive EV traveling mode is released, based on the needed MG1 output P1 [%] and the needed dual drive continuation time period Δt [sec] which indicate driver's tendency to request drive power, the present disclosure is not limited thereto. The release temperature T2 (for example, a constant value) may be set in advance by experiment, simulation, or the like, and traveling control may be performed by using the release temperature T2.

While the embodiment is configured to stop the rotation of each of the output shaft 1$a$ of the engine 1 and the carrier CA4 of the planetary gear mechanism 4 with the one-way clutch 2 in the dual drive EV traveling mode, the present disclosure is not limited thereto. The rotation of each of the output shaft 1$a$ of the engine 1 and the carrier CA4 of the planetary gear mechanism 4 may be selectively stopped by using other brake mechanisms than the one-way clutch 2.

The present disclosure is not limited to the hybrid vehicle illustrated in FIG. 1 and can be applied to a hybrid vehicle having other configurations. For example, the control device of the embodiment of the present disclosure can be applied to a hybrid vehicle in which the rotating shaft of the first motor generator MG1 and the rotating shaft of the second motor generator MG2 are disposed on the same axis.

While the embodiment describes the case of applying the present disclosure to an FF vehicle (hybrid vehicle), the present disclosure is not limited thereto and can be applied to a front-engine rear-drive (FR) vehicle or a four-wheel drive vehicle.

The present disclosure can be effectively used for control of a hybrid vehicle that enables setting a dual drive EV traveling mode in which the vehicle travels by the output torque of both of a first motor and a second motor.

What is claimed is:

1. A control device for a hybrid vehicle, the hybrid vehicle including an engine as a drive power source, a first motor as a drive power source, a second motor as a drive power source, a planetary gear mechanism, and a brake mechanism, the planetary gear mechanism including a sun gear, a ring gear, a carrier to which output torque of the engine is transmitted, a pinion gear, and a pinion pin, the brake mechanism being configured to selectively stop rotation of the carrier, one of the sun gear and the ring gear being connected to the first motor, the other being connected to an output member that transmits power to a drive shaft side of the hybrid vehicle, the second motor being connected to the output member, the control device comprising an electronic control unit configured to set any traveling mode of a hybrid traveling mode, a single motor drive electric traveling mode, and a dual motor drive electric traveling mode in accordance with requested drive power, the hybrid traveling n:mode being a mode in which the hybrid vehicle travels by drive power including at least the output torque of the engine, the single motor drive electric traveling mode being a mode in which the hybrid vehicle travels by output torque of the second motor, and the dual motor drive electric traveling mode being a mode in which the hybrid vehicle travels by output torque of both of the first motor and the second motor in a state where the rotation of the carrier is stopped by the brake mechanism, prohibit setting of the dual motor drive electric traveling mode when a pinion temperature that is a temperature of the pinion gear or the pinion pin is higher than an upper limit temperature, and set the hybrid traveling mode instead of the dual motor drive electric traveling mode, release the prohibition of the dual motor drive electric traveling mode when the pinion temperature is decreased to or below a release temperature lower than the upper limit temperature in a state where setting of the dual motor drive electric traveling mode is prohibited, restrict output of the first motor in the dual motor drive electric traveling mode when the pinion temperature which is the temperature of the pinion gear or the pinion pin is higher than the upper limit temperature, and release a state of restricting the output of the first motor when the pinion temperature is decreased to or below a lower limit temperature lower than the release temperature in the state of restricting the output of the first motor.

2. The control device according to claim 1, wherein the electronic control unit is configured to set an upper limit of the output of the first motor to be smaller as the pinion temperature becomes higher.

3. The control device according to claim 1, wherein:
the electronic control unit is configured to acquire driver's tendency to request drive power; and
the electronic control unit is configured to set the release temperature based on the driver's tendency to request drive power.

* * * * *